G. W. DENNIS.
CONCENTRATOR OR SEPARATOR.
APPLICATION FILED MAY 11, 1907.
971,025.
Patented Sept. 27, 1910.
4 SHEETS—SHEET 3.
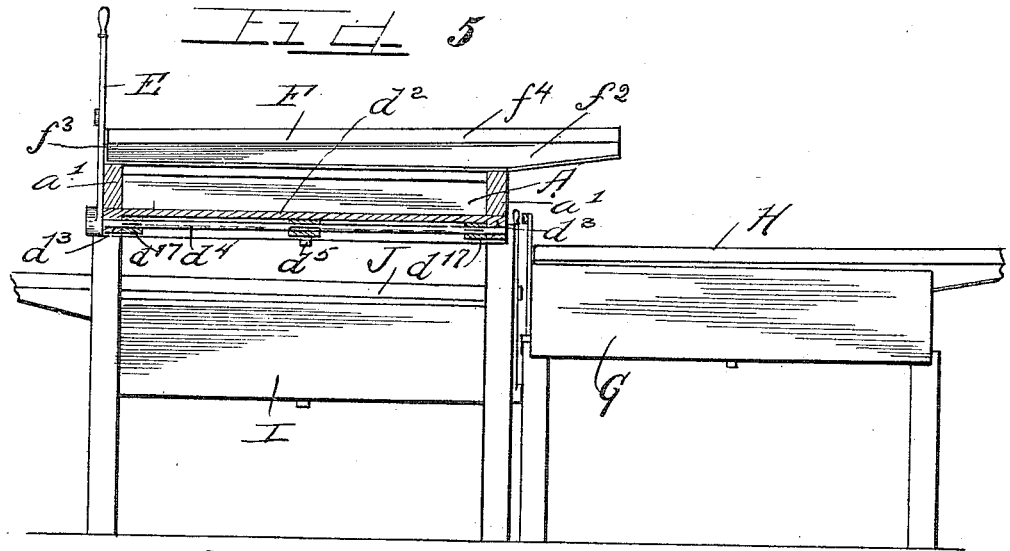
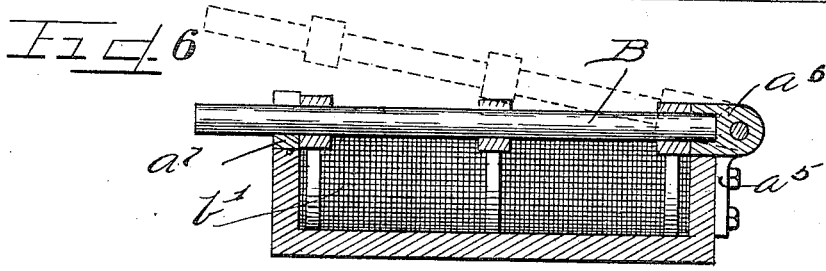
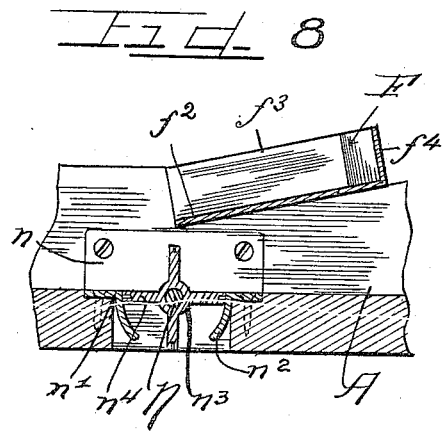
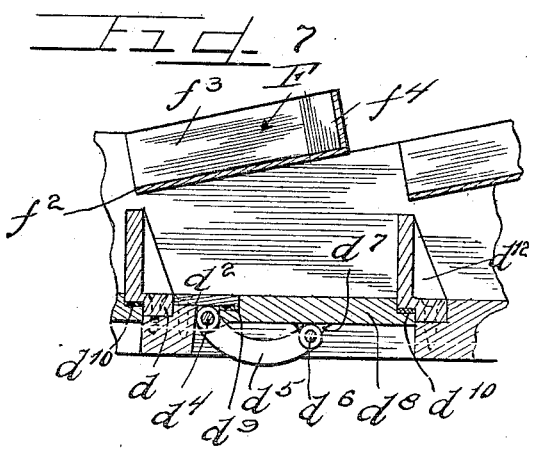
Witnesses
J. W. Angell.
R. E. Hannah.
Inventor
George W. Dennis
Charles W. Fier Atty.

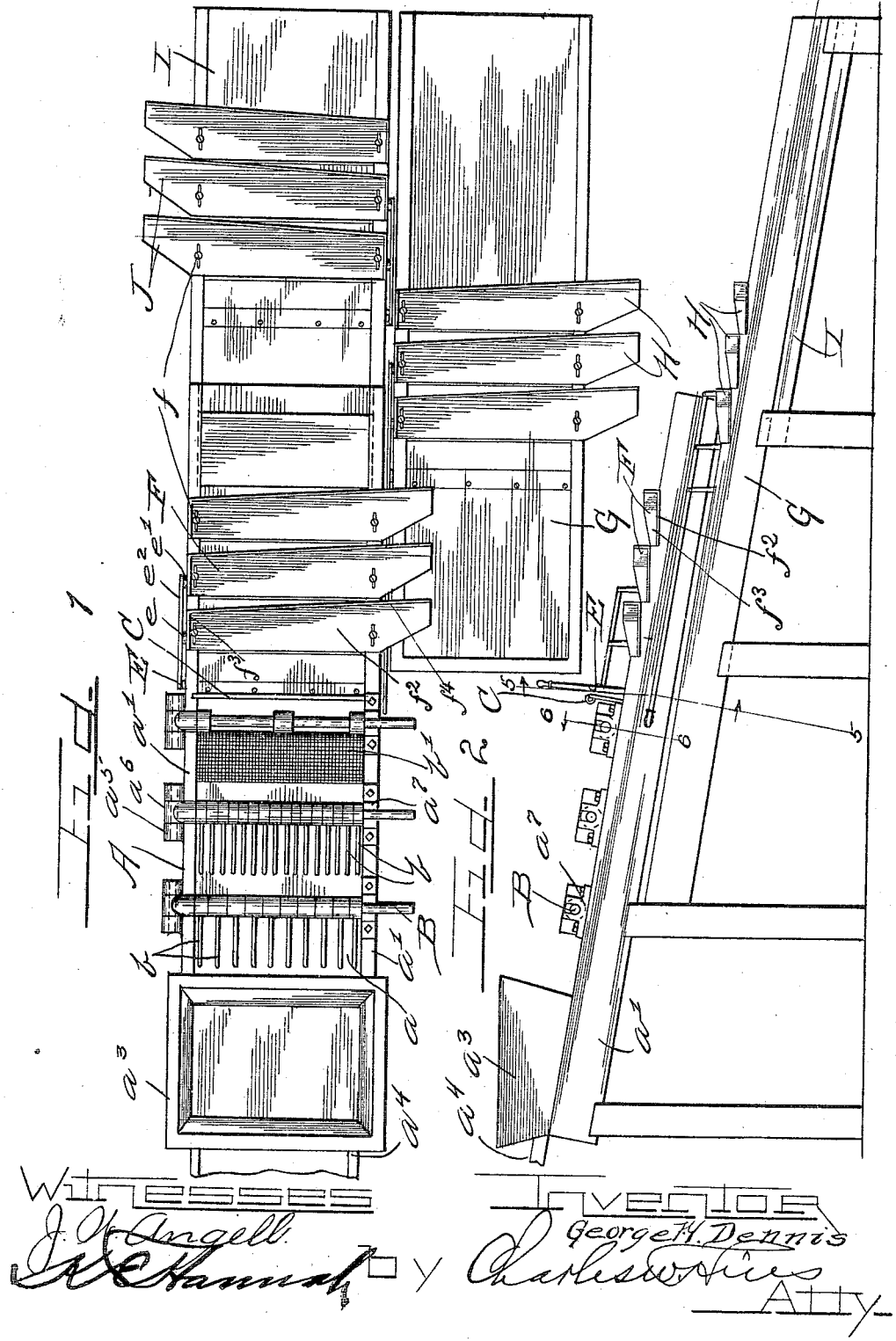

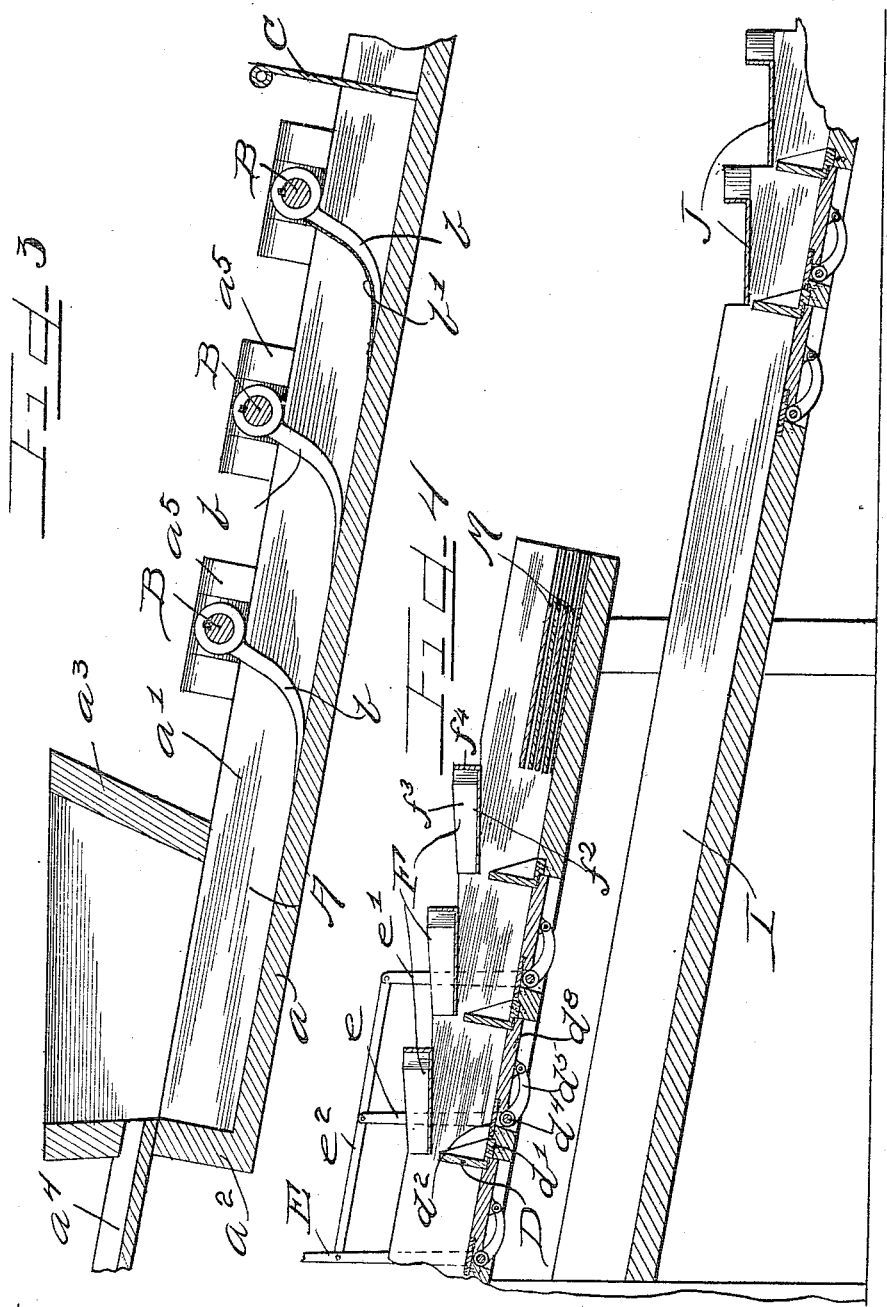

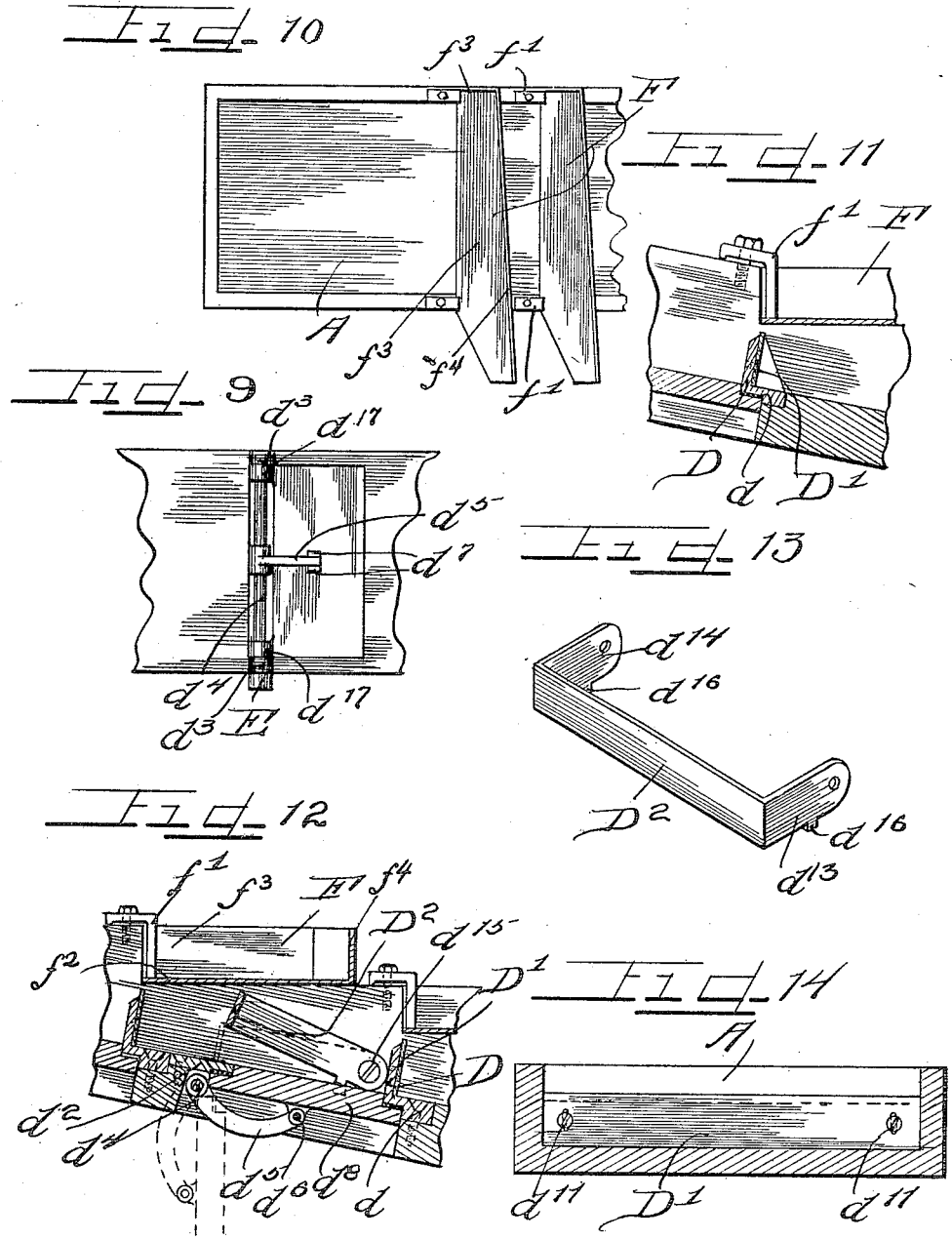

UNITED STATES PATENT OFFICE.

GEORGE W. DENNIS, OF HARVEY, ILLINOIS.

CONCENTRATOR OR SEPARATOR.

971,025.

Specification of Letters Patent. Patented Sept. 27, 1910.

Application filed May 11, 1907. Serial No. 373,130.

*To all whom it may concern:*

Be it known that I, GEORGE W. DENNIS, a citizen of the United States, and a resident of the city of Harvey, in the county of Cook and State of Illinois, have invented certain new and useful Improvements in Concentrators or Separators; and I do hereby declare that the following is a full, clear, and exact description of the same, reference being had to the accompanying drawings, and to the letters of reference marked thereon, which form a part of this specification.

This invention relates to improvements in concentrators or separators.

Heretofore in mining operation it has been a very serious problem to save all the gold from the tailings and gangue particularly the minute particles known as flour gold and to separate all the values from the material with which they are mixed. In mining the ore, after being crushed or stamped is mixed with water and then usually passed over mercury plates. This catches most of the heavier spangles of the precious metal coming immediately in contact therewith and the very fine particles or flour gold together with the tailings are usually passed into large tanks for cyaniding should such be connected with the mill. Owing to the fact that the minute particles of gold in the cyanid tanks are mixed with material which varies in coarseness, the mixture cannot pack closely and the cyanid mixture is allowed to sink therethrough much faster than would be the case if the coarse tailings were entirely eliminated from the mixture and only the exceedingly fine waste material were run into the tank with the gold. Where the cyanid mixture sinks too rapidly through the material in the tank but a small portion of the gold may be dissolved for a given quantity of cyanid. This makes the mining of low grade ore, in which the gold is always in very minute particles, expensive, in fact unless mined in large quantities and in the most economical manner the expense is practically prohibitive. Again in placer mining the material washed into the sluice box or trough is from one to several inches in depth and inasmuch as the finest particles including of course all the flour of gold floats to or near the surface of the water, it is not taken up by the mercury plates when such are used but passes out with the tailings and is lost, whereas if these fine particles of gold together with the gangue could be concentrated from the coarse tailings the values could be cyanided out of the concentrates thus produced. On the other hand when sluice boxes or troughs provided with riffles therein are used in placer mining only the heavy gold and the coarse material moving along the bottom of the trough are retained by said riffles and in this case also the finer gold is carried by the water over the riffles and is lost, and the material passing through the trough has not usually heretofore been worked both from the top and the bottom during its passage through the trough. Furthermore when the riffles are filled with the gold and sand it has always heretofore been necessary to stop the washing to remove the material from the riffles for the purpose of cleaning up. This necessitates a great waste of time, often several days whereas if the material caught by the riffles could be shunted to another trough without stoppage of the mining operation obviously the washing of the placer through the sluices and the cleaning or panning operation would be continuous and each independent of the other and inasmuch as in some places often the mining season is short owing to the water supply and other conditions a maximum area could be cleaned up in a minimum amount of time.

It is an object of this invention to provide a separator or concentrator adapted for use in placer mining to work the material passing through the sluice box or trough, both from the top and the bottom, thus catching all the values and concentrating the treated material to the greatest possible extent and grading the same as to fineness.

It is an important object of this invention to provide means for almost instantaneously cleaning the trough by dumping the material retained by the riffles or partitions into a suitable receptacle or trough where they may be cleaned up independently of and without stopping the washing.

It is also an important object of this invention to provide auxiliary riffles or partitions which operate when the main riffles are being cleaned, and which are automatic in operation and positively prevent escape of any of the material while cleaning the riffles.

It is also an object of this invention to provide a device through which the material may be passed after passing the mercury plates in the stamp mill and which acts to separate any remaining gold from the coarser tailings, grading the same according to the size of the particles of gold and adapted to deliver the different grades of the concentrates into separate tanks if desired. This insures the maximum effect of the cyanid and also economizes space in the tanks by delivering the coarse tailings from which all the gold has been extracted to the dump.

It is further an object of this invention to provide adjustable riffles and adjustable trays or skimmers coacting therewith and also means for regulating the volume of material delivered through the sluice box or trough for most efficient operation thus regulating and economizing in the amount of water used preventing waste.

It is also an object of this invention to provide means for catching any coarse rock, sticks, etc. to prevent injury or clogging of the various parts.

It is a further object of this invention to provide an exceedingly efficient and simple device, positive in operation, quickly and easily installed and as quickly knocked down, which is portable and does not necessitate the employment of skilled labor.

The invention consists in the matters hereinafter described and more fully pointed out and defined in the appended claims.

On the drawings: Figure 1 is a top plan view of a device embodying my invention. Fig. 2 is a side elevation thereof. Fig. 3 is a central longitudinal section taken through the screens. Fig. 4 is a vertical longitudinal section taken through the trays or skimmers. Fig. 5 is a section on line 5—5 of Fig. 2. Fig. 6 is an enlarged section on line 6—6 of Fig. 2 with parts omitted. Fig. 7 is an enlarged fragmentary detail of the dumping bottom and mechanism. Fig. 8 is an enlarged fragmentary detail of a modified form of dumping mechanism. Fig. 9 is a bottom plan view of the dumping bottom and mechanism. Fig. 10 is a top plan view of the trays or skimmers illustrating a modified form of fastening means. Fig. 11 is an enlarged section taken transversely through the tray and riffles. Fig. 12 is an enlarged detail illustrating the operation of the auxiliary riffle. Fig. 13 is an enlarged perspective view thereof. Fig. 14 is an enlarged detail of the adjustable riffle or partition.

As shown in said drawings: A indicates a sluice box or trough constructed of suitable material comprising a bottom member $a$ having side members $a'$ rigidly secured thereto. An end member $a^2$ is rigidly secured at the front end of the sides and bottom. A hopper $a^3$ is secured to the front end of the trough into which the material and water is delivered. A flume $a^4$ as shown may convey the material to the hopper.

Rigidly secured to one of the side members $a'$ are supports $a^5$ having forked upper ends, secured to which by means of journal boxes $a^6$, are transverse shafts B the ends of which project beyond the side members and rest in a suitable journal box $a^7$ secured on the side walls. Rigidly secured on each shaft B within the trough in any preferred manner are teeth $b$ which provide a screen to catch the larger fragments of rock and the coarse material washed down from the hopper. As shown the teeth $b$ on the second shaft are arranged closer together than those on the first and a reticulated wire screen $b'$ is secured on the teeth $b$, on the third shaft, said teeth as shown being three in number and arranged at each end and centrally of the shaft.

A vertically slidable plate C, is secured in oppositely disposed grooves in the side members $a'$ below the last screen to regulate the amount of material admitted therebeneath.

Secured to the bottom of the sluice box or trough A and positioned the desired distance apart is a series of riffles or upright partitions D which fit tightly between the sides of the sluice box, extending approximately half the height of the trough. These may of course be of any preferred number and act to retain the coarse heavy material permitting the lighter material to pass thereover. As shown in Figs. 11, 12 and 14 a riffle or partition D' provided with slots at each end thereof is adjustably secured to the riffles D, by means of screws or bolts $d^{11}$ or otherwise. Said partitions D are each provided with a flange $d$ which is rigidly secured in a notch in the bottom of the trough by means of screws or in any preferred manner. End braces $d^{12}$ rigidly connect the partition and flange, to afford rigidity. A plate $d^2$ of suitable material is rigidly secured in a notch in the bottom of the trough above each partition and is provided with a downwardly directed bearing $d^3$ at each end thereof as shown in Fig. 5. Journaled in the bearings $d^3$ is a shaft $d^4$ to which is rigidly secured at each end thereof adjacent the bearings, a hinge $d^{17}$ which is rigidly secured to the dumping bottom $d^8$. An arm $d^5$ is rigidly engaged to said shaft centrally thereof and at its forward end is pivoted to the dumping bottom $d^8$ by means of the pintle $d^6$ which is secured in lugs $d^7$. Suitable packing $d^9$—$d^{10}$ is secured around the edge of the section to afford a water tight joint. Rigidly secured to the outer end of the first shaft $d^4$ is a lever E and levers $e$—$e'$ are secured to the other shafts $d^4$ which are operatively connected to the lever E by means of a connecting rod $e^2$.

Auxiliary riffles or partitions $D^2$ provided with integral rearwardly directed arms $d^{13}$—$d^{14}$ are pivoted above each riffle or partition D by means of screws or bolts $d^{15}$ and each arm is provided with a lug $d^{16}$ adjacent and below the pivot which bears on the respective dumping bottom or section $d^8$ normally holding the auxiliary partition or riffle $D^2$ elevated as shown in Fig. 12. Said riffle or partition is of any suitable height so that the same may be normally elevated sufficiently to permit the material to pass thereunder without contacting the trays above the same.

Trays or skimmers F are adjustably secured as to inclination and angularity with the side walls in oppositely disposed angular notches in the side members $a'$ by means of set screws $f$ which extend through slots in the bottom of the tray and engage in the side walls or clamps $f'$ shown in Figs. 10, 11 and 12 may be used which are secured to the top of the side members $a'$ and each having a downwardly directed leg bearing firmly against the bottom of the tray F. Said trays or skimmers F as shown comprise each an inclined bottom $f^2$ which is of greater width at one end than the other and is inclined at a point from adjacent the wide end inwardly to the extremity thereof. The tray is provided with an end wall $f^3$ at the narrow end of the bottom and a back wall $f^4$ both of which may be integral with the bottom. The open ends of said trays or skimmers project beyond the side wall and discharge into a trough G, similar to the trough A. Secured in said trough G, is a set of trays or skimmers H and partitions or riffles and dumping mechanisms all constructed as before described.

Rigidly secured beneath the trough A on suitable supports is a trough I constructed as before described and engaged thereto are trays J and partitions or riffles and dumping mechanism therefor similar to that before described.

The operation is as follows: In placer mining the sluice box and mechanism is suitably installed and operation commenced and the material passes through the screens which grade the same and retain any large fragments of rock or other debris. As the heavier tailings and spangles of gold are forced along near the bottom of the trough and the lighter or flour gold together with the fine tailings float on or near the surface of the water it is obvious that the riffles or partitions D retain the heavier material and are sufficiently low to permit the upper stratum of water carrying the fine gold etc., therewith to pass readily over the same and into the next lower section where the process is repeated. The trays or skimmers F are adjusted to skim the upper stratum of material and the depth of the skim varies with the conditions and with the number of sets of trays. When the coarse material accumulates sufficiently behind each riffle or partition the lever E is actuated operating the dumping sections to empty the contents into a suitable lower trough which conveys the heavier material to a convenient place for cleaning up. If it is desired to further concentrate this coarse material before cleaning up the trough or sluice box I is positioned beneath the sluice box or trough A in position to receive the material therefrom which in turn again pass through the process before described. The concentrates may be collected for shipment or the trays may empty into a tank for cyaniding. Where the material after passing the plates in the stamp mill or when plates are employed in placer mining to extract the coarse gold the operation is slightly different. In this case the device is installed as before described so that the material after passing the plates empties thereinto and in this case practically the only gold contained in the material is the very fine particles. As before described the trays skim the desired stratum of the material and the riffles retain the coarse material all of which is practically tailings and suitable troughs or flumes are used to convey the material from the trays into the proper cyanid tank. A trough or troughs are positioned to catch the tailings which are delivered to the dump. Where a series of concentrating sets say four or six are thus employed the first series is set to just skim the top of the water, the second to skim a deeper stratum and so on, each emptying into a trough leading to a separate tank and the material thus is practically concentrated to the same sizes which allow most effective use of the cyanid. If preferred the concentrated material from the sets F or J may be reconcentrated as shown in Fig. 1. In this case the trough or sluice box G is employed and the pans or trays H and dumping mechanism are positioned to receive the material from the set of trays F. The stratum of water in the trough G is very thin consequently a very thin skim is made which is passed into one tank and the other material emptied through the bottom into a trough or flume, leading to a separate tank and in this way the material may be reconcentrated any number of times if found necessary. The coarse material which with a milling process is dumped from the riffles of the trough I is emptied into a trough which carries the same to the dump and as this material is by far the greater amount it is seen that not only a vast amount of material need not be cyanided but that the material which is cyanided is of such equal fineness as to insure maximum effect of the cyanid at the same time effecting a considerable saving in the amount of this chemical used. Of course should it be desired to concentrate the coarse material retained by the riffles the sluice box or trough I catches the material dumped from the tray F which then may go through concentrating processes the desired number of times.

By adjustment of the plate C the amount of water used may be regulated to best suit the various conditions of the material thus permitting economy in the use of the water while at the same time affording the most efficient concentration of the material.

The auxiliary riffles or partitions are normally held elevated when the dumping bottoms are closed but immediately the same are opened they drop by gravity affording a retaining wall to prevent passage of the unconcentrated material until the bottoms are again closed and inasmuch as the action of the dumping bottoms is almost instantaneous the material can never accumulate sufficiently to flow over the top thereof.

When either of the screens becomes filled with refuse material the same are rotated slightly to scoop the material into the screen after which by simply swinging the respective shafts on its pivot over the side of the trough the material falls by gravity and the screen is returned to normal and it is obvious that should any coarse material be washed into the trough while the front screens are being dumped the rear ones catch any material thus preventing injury or clogging at the trays and dumping sections. It will also be seen that either of the trays may be adjusted to merely skim the surface of the water or a stratum of any required depth or the riffles may be adjusted to effect this result.

Under certain conditions it may be desired to run the material over mercury plates as for instance in placer mining it may be preferable to pass the material first through a series of riffles and trays, then over the plates, and to repeat this process several times. In this case the plates M may be arranged in both the trough A and in the trough I or any other arrangement of the plates may be made which best suits the special requirements.

An almost unlimited number of changes in detail of construction may be made as for instance the dumping bottom may be replaced by the dumping mechanism shown in Fig. 8, in which case the bottom of the trough is slotted and a casting is fitted therein. Said casting as shown comprises end plates $n$ which are secured to the sides of the trough and integral therewith is a plate $n'$, one on each side which are seated in notches in the bottom of the trough and an integral curved flange $n^2$ extends downwardly into said notch. A shaft N is journaled in the sides of said trough on which is rigidly secured the hub $n^3$ having radial blades $n^4$ arranged at right angles and of a length to fit closely between the side member of the trough. Suitable packing is provided wherever necessary to provide water tight joints.

I claim as my invention:

1. A concentrator and separator embracing an inclined trough having notched side members, skimmers adjustable in said notches in the side members, riffles rigidly but removably secured to the bottom of the trough, riffles adjustably secured to said riffles and a dumping section for each riffle normally forming part of the trough.

2. In a device of the class described a trough, riffles rigidly secured therein, skimmers in said trough, one for each riffle having its forward edge above the riffle, means for adjusting each skimmer to vary the distance of its edge above the top of the respective riffle and an adjustable riffle secured to each rigid riffle adapted to be adjusted toward or from the respective skimmer.

3. A concentrator or separator comprising a sluice box having its side members notched, riffles acting from the bottom of the sluice box, skimmers adjustable in the notches to vary the distance between the edge of the same and the top of the riffles, said skimmers acting from the top of material running thereby.

4. A concentrator or separator comprising a sluice box, riffles acting from the bottom thereof, skimmers acting from the top of a moving mass of material and dumping sections in advance of the riffles forming part of the bottom of the trough and adjustable for emptying the material retained thereby without stopping the operation.

5. A concentrator or separator comprising riffles acting from the bottom, skimmers acting from the top of a moving mass of material, means for dumping the material retained by the riffles without stopping the operation and automatically operating auxiliary riffles for preventing waste of the unconcentrated material while dumping.

6. A device of the class described comprising a sluice box or trough, means secured thereto for grading the material according to size as it moves along the trough and acting from both the top and the bottom thereof, dumping means normally forming a part of said sluice box and means for simultaneously dumping the same.

7. A concentrator embracing a trough of riffles secured therein for catching the coarser material, means for concentrating the finer particles according to the size thereof, means for emptying the coarse material from the trough and auxiliary riffles normally elevated to permit material passing thereunder and lowered by operation of said emptying means to retain the unconcentrated material from escape while emptying the coarse material.

8. In a device of the class described a trough, coacting skimmers and riffles therein arranged in pairs, each skimmer having its forward edge in vertical alinement with the edge of the respective riffle and means for adjusting the riffle toward and from the appropriate skimmer.

9. In a device for the purposes set forth a trough, riffles therein spaced suitable distances apart, skimmers secured to the top of the trough spaced corresponding distances apart and adjustable longitudinally of the trough, dumping sections in the bottom of the trough and means for simultaneously opening and closing the same.

10. In a device of the class described the combination with a trough of means admitting thereinto the material to be concentrated, means in said trough for collecting the lighter and finer particles from the material admitted into the trough, means for catching the coarse material admitted into the trough and normally elevated riffles adapted for automatic adjustment to replace the aforesaid means for catching the coarse material.

11. In a device of the class described the combination with a trough into which the material to be concentrated is conveyed, of a series of skimmers in said trough adapted to separate the lightest and finest particles from the material, a series of skimmers adapted to again separate the remaining material after removal of the lighter particles, a series of skimmers adapted to reseparate the material from the first named series of skimmers, riffles, one for each skimmer adapted to catch the heavy material and dumping sections normally forming a part of the bottom of said trough adapted to dump the heavy material.

12. A concentrator embracing a sluice box or trough of screens therein for retaining the coarsest material, riffles in said trough dividing the same into compartments adapted to retain the coarsest material after passing the screens, adjustable separator skimmers each having one edge above the respective riffle and adapted to separate the finest material, means for emptying the coarse material from the compartments by gravity and auxiliary riffles automatically adjusted to retain the flow of the material through the trough while the coarse material is being emptied.

13. In a device of the class described the combination with a trough of screens therein, means for dumping material from the screens, riffles in said trough, a separator skimmer for each riffle having one edge above the same, means for adjusting the skimmers to vary the distance between the edge of the skimmer and top of the riffle and dumping sections, one for each riffle.

14. In a device of the class described the combination with a trough, screens pivoted thereto adapted to be dumped over the side thereof, skimmers adjustably secured to the top of the trough, riffles secured to the bottom of the trough, means regulating the volume of material delivered through the trough and simultaneously operating dumping sections for said trough normally forming a part of the bottom thereof.

15. In a concentrator, a trough, screens therein for retaining stones and other debris, means retaining the coarsest material admitted through said screens, skimmers for separating the finest particles from the material admitted past the screens, adjustable means for varying the volume of water passing the skimmers, riffles, one below each skimmer, dumping sections, one in advance of each riffle and auxiliary riffles in said trough.

16. In a device of the class described the combination with a trough of shafts pivoted thereto, screens secured thereon, a vertically slidable plate below the last screen for limiting the volume of material passing thereby, means for concentrating the material after passing the screens, means for adjusting said concentrating means and dumping sections hinged to the bottom of the trough and normally forming part of the trough.

17. In a device of the class described a trough, coacting pairs of skimmers and riffles therein, each skimmer and each riffle of each pair being adjustable to vary the stratum of material acted upon and sections forming the bottom of the trough adapted for dumping the material retained by the riffles.

18. In a device of the class described the combination with a trough of riffles therein, a dumping section adjacent each riffle, means for actuating each section, a skimmer positioned above each section inclined toward the riffle and having an open end above each riffle and means for adjusting each skimmer to vary the stratum of material caught thereby.

19. In a device of the class described the combination with a trough having inclined notches in the side members thereof and having slots in the bottom, of a plurality of skimmers slidable in said notches, shafts journaled below the trough, hinges rigidly secured thereto at one end, dumping sections connected with said hinges adapted to closely fit in the slots in the bottom of the trough, packing means therefor, a lever secured to each shaft, an arm secured to each shaft and the respective dumping section, a rod connecting all of said levers, and riffles in said trough of less height than the height of the trough adapted to retain the coarse material.

20. In a device of the class described the combination with a sluice box or trough of riffles removably secured thereto, dumping sections by means of which the riffles are cleaned and auxiliary riffles in the trough adapted to retain the material when cleaning the main riffles.

21. In a device of the class described the combination with a trough or sluice box of a riffle rigidly secured thereon, a riffle hinged therein adjacent the same, a dumping bottom in said trough and means for dumping the same.

22. In a device of the class described the combination with a sluice box or trough of skimmers adjustably secured thereto, clamps holding said skimmers in adjusted position, means receiving the material from said skimmers, riffles rigidly secured in the bottom of the trough and a section adjustably engaged to each riffle to vary the height thereof.

23. In a device of the class described the combination with a sluice box or trough of means therein separating from the bottom of the material passing therethrough, means simultaneously separating from the top of the material passing through the trough, normally closed simultaneously acting dumping sections, dumping by gravity the material separated by the bottom means and means receiving the separated material from the top separating means.

24. In a device of the class described the combination with a sluice box or trough of skimmers adjustably secured thereto, adjustable riffles secured therein, a dumping section adjacent each riffle, a shaft operatively connected with each dumping section and means for operating said shafts to operate said sections.

25. In a device of the class described the combination with a sluice box or trough of skimmers adjustably secured thereto, adjustable riffles secured therein, a dumping section adjacent each riffle, a shaft operatively connected with each dumping section, means for operating said shafts to operate said sections and automatically acting auxiliary riffles adapted to prevent escape of the material when the sections are in dumping position.

26. In a device of the class described the combination with a sluice box or trough of a skimmer secured thereto, riffles beneath the same, a dumping section for each riffle, means for operating the same and a riffle actuated by movement of the dumping sections to retain the material when the dumping bottom is actuated.

27. In a device of the class described the combination with a sluice box or trough of a skimmer secured thereto, riffles beneath the same, a dumping section for each riffle, means for operating the same, a riffle actuated by movement of the dumping sections to retain all material from escape when dumping and screens adapted to prevent clogging or stopping of the different parts.

28. In a device of the class described a trough having inclined notches in its side members, skimmers adjustably secured in the notches, riffles in the trough, sections normally forming part of the bottom of the trough and adapted to be opened and riffles normally out of operative position adapted to automatically move to and from operative position by opening and closing of the sections.

29. In a device of the class described the combination with a trough of skimmers adjustably secured thereto, extensible riffles rigidly secured to the bottom of the trough, pivotal auxiliary riffles adapted to rest on the bottom of the trough and pivotal sections forming part of the bottom of the trough adapted to clean the riffles.

30. In a device of the class described a trough having oppositely disposed notches in the side members inclined toward the entrance end of the trough, skimmers, one in each pair of notches, riffles rigidly secured to the bottom of the trough, slotted extensions for said riffles and means extending through the slots and engaging the riffles for adjustably securing the extensions thereto.

31. In a device of the class described the combination with a trough of skimmers secured to the top thereof and adjustable longitudinally thereof to vary the height from the bottom of the trough, riffles secured to the bottom of the trough having their upper edges below the lowest adjustment of the skimmers, riffles adjustably secured thereto and simultaneously operating dumping sections, one in front of each riffle.

32. In a device of the class described the combination with a trough of screens pivoted to dump over the sides thereof, riffles in said trough spaced suitable distances apart, riffles secured thereto for varying the height thereof, skimmers adjustable longitudinally of the trough, auxiliary riffles pivoted to the sides of the trough and dumping sections pivoted beneath the trough.

In testimony whereof I have hereunto subscribed my name in the presence of two subscribing witnesses.

G. W. DENNIS.

Witnesses:
K. E. HANNAH,
J. W. ANGELL.